June 17, 1924.
F. J. STEMMRICH
1,497,805
SIGNAL FOR VEHICLES
Filed May 21, 1921
6 Sheets-Sheet 1
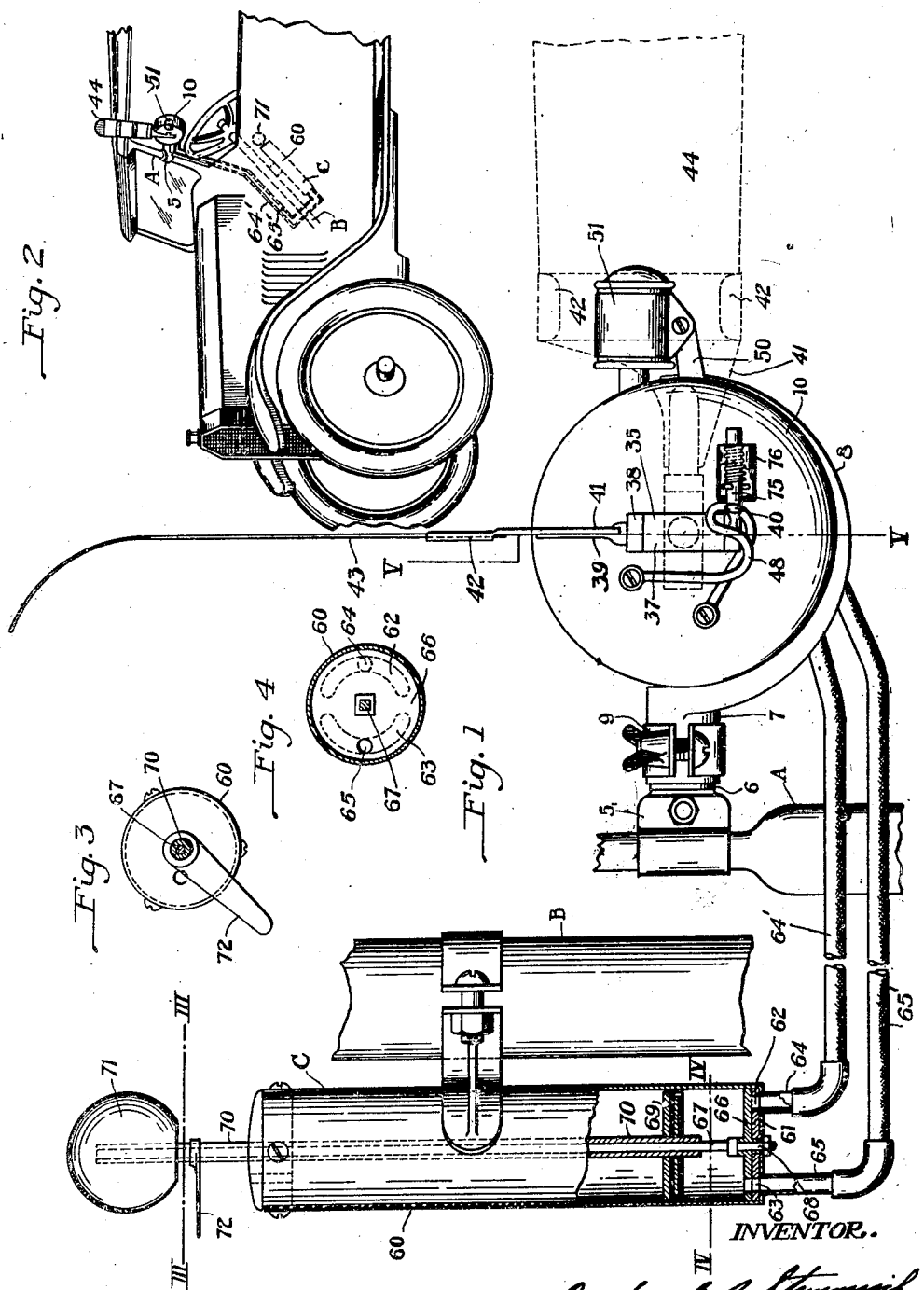

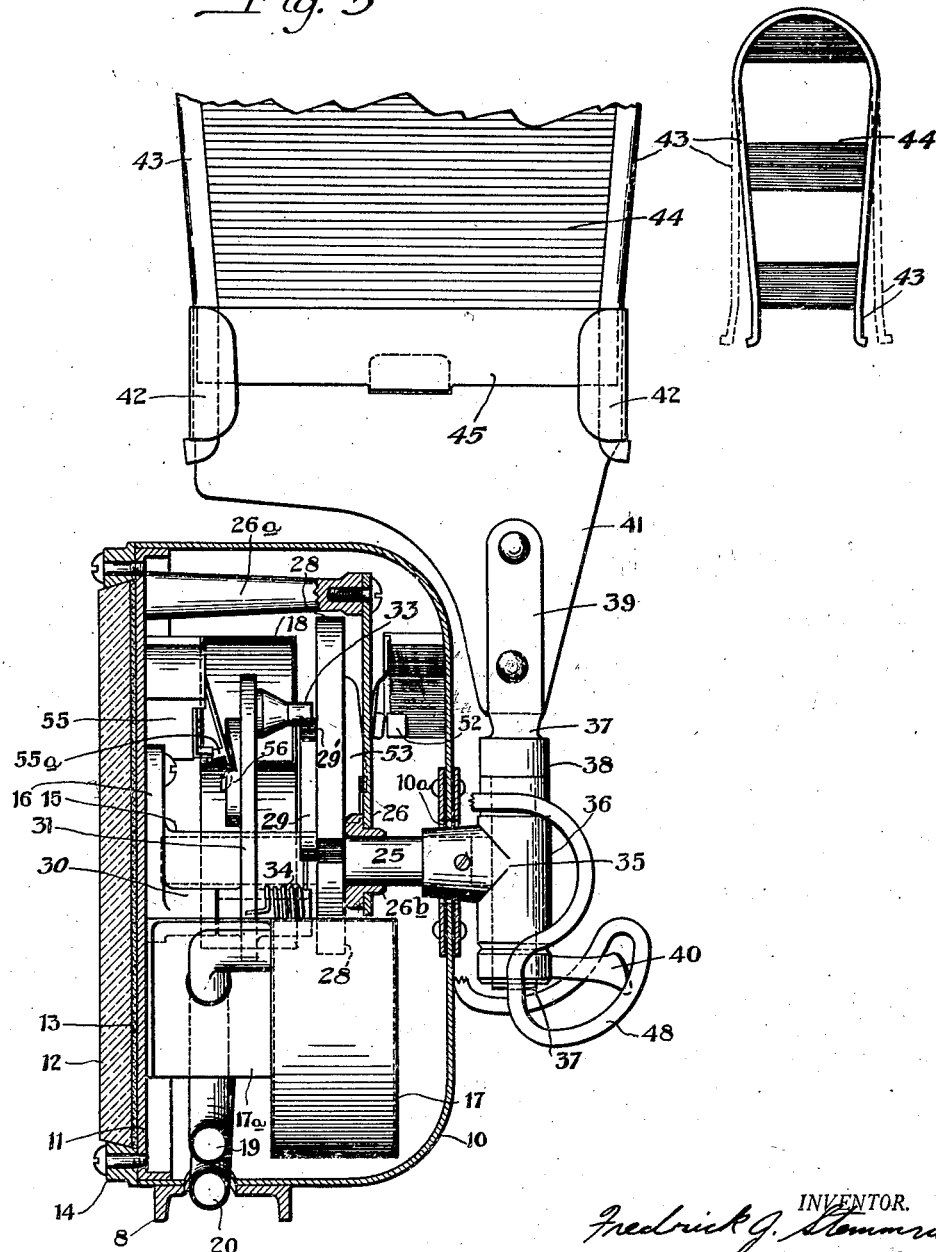

June 17, 1924.

F. J. STEMMRICH

SIGNAL FOR VEHICLES

Filed May 21, 1921   6 Sheets-Sheet 3

1,497,805

INVENTOR.
Fredrick J. Stemmrich
by Clarke & Doolittle
his attorneys.

June 17, 1924.
F. J. STEMMRICH
SIGNAL FOR VEHICLES
Filed May 21, 1921
1,497,805
6 Sheets-Sheet 4
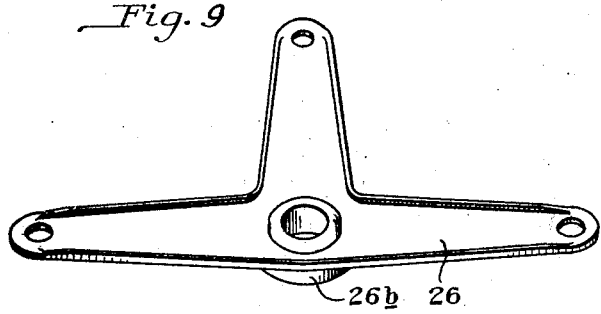
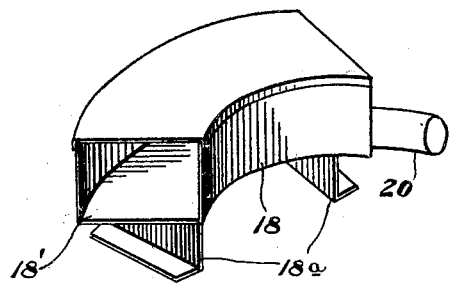
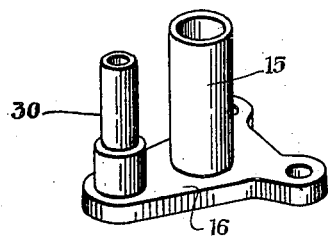
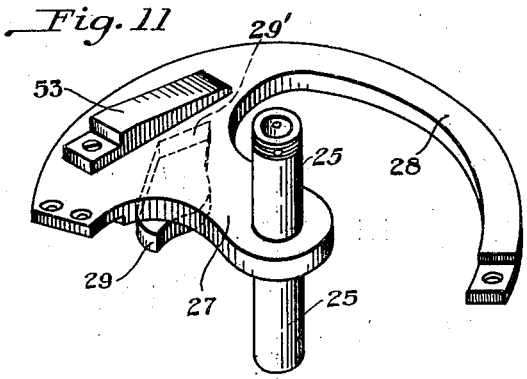
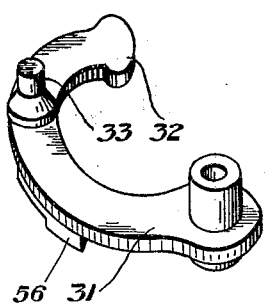
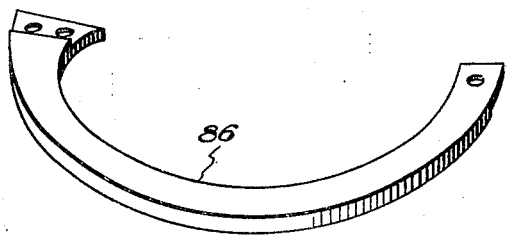

June 17, 1924.

F. J. STEMMRICH 1,497,805

SIGNAL FOR VEHICLES

Filed May 21, 1921

INVENTOR.
Fredrick J. Stemmrich
by Clarke & Doolittle
his attorneys.

Patented June 17, 1924.

1,497,805

UNITED STATES PATENT OFFICE.

FREDRICK J. STEMMRICH, OF EAST PITTSBURGH, PENNSYLVANIA.

SIGNAL FOR VEHICLES.

Application filed May 21, 1921. Serial No. 471,471.

*To all whom it may concern:*

Be it known that I, FREDRICK J. STEMM-RICH, a citizen of the United States, residing at East Pittsburgh, in the county of Allegheny, State of Pennsylvania, have invented certain Improvements in Signals for Vehicles, of which the following is a specification.

This invention is for a signal for vehicles to enable the driver to indicate when the vehicle is going to slow down, make a curve, or stop, and relates particularly to a signal for this purpose which is especially adapted for use on automobiles, to indicate to persons in front or to the rear of the automobile the intention of the driver, and which may be used on either closed or open cars.

An object of this invention is to provide a signal of this kind adapted to be secured to some outside part of the automobile, preferably the wind shield, and which may be controlled from the driver's seat.

A further object of the invention is to provide a signal of this kind having a signal arranged to offer a minimum wind resistance when in raised position and to be substantially invisible to persons at the front and rear of the machine, but which may be swung through an arc and at the same time rotated to be conspicuous when at its "danger" or warning position.

Further objects are to provide a signal which shall be illuminated when in warning position, and which will give an audible warning to attract attention when moving to such position, and which device has a mirror combined therewith to enable the driver to see what is at the rear of his machine.

These and other objects of the invention may be seen from the following detail description thereof, in connection with the accompanying drawings, in which:

Fig. 1 is a front view of the signal, showing it clamped to one side of a windshield support of a vehicle, and showing a portion of a steering post with a pump for operating the device by fluid pressure, the pump being shown partly in section and partly in elevation;

Fig. 2 is a diagrammatic view of the apparatus shown in Fig. 1, indicating the location of the parts on an automobile;

Fig. 3 is a section on line III—III of Fig. 1;

Fig. 4 is a section on line IV—IV of Fig. 1;

Fig. 5 is an enlarged sectional view on line V—V of Fig. 1, showing only the casing in section, and showing the mechanism in elevation;

Fig. 6 is a detail view on a small scale of the indicator or signal;

Fig. 9 is a detail view showing in perspective a supporting member used in the device;

Fig. 10 is a perspective view of a pedestal which provides a journal for certain parts of the mechanism;

Fig. 11 is a perspective view of one of the signal operating parts;

Fig. 12 shows an armature adapted to be secured to the device shown in Fig. 11;

Figure 8:
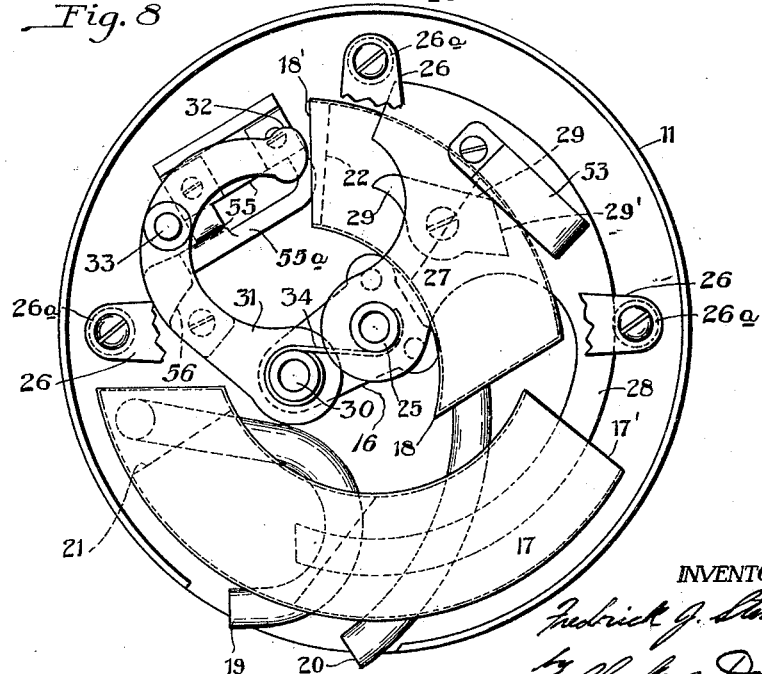
Fig. 8 is a similar view showing the position of the parts when the indicator is in lowered or warning position, and showing the supporting member broken away.
Figure 16:
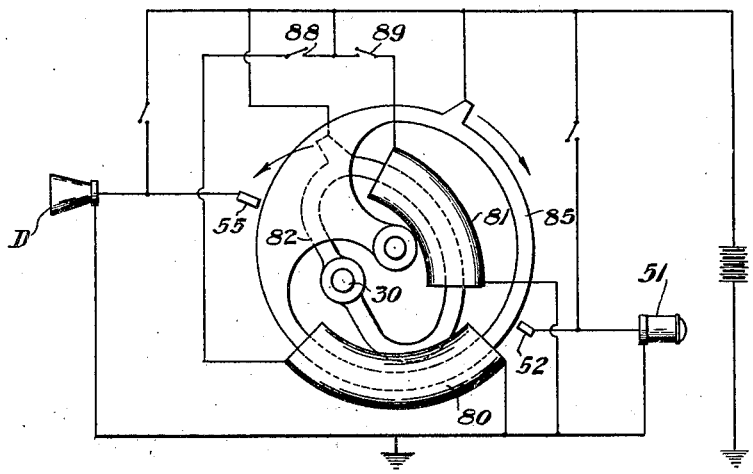
Figure 15:
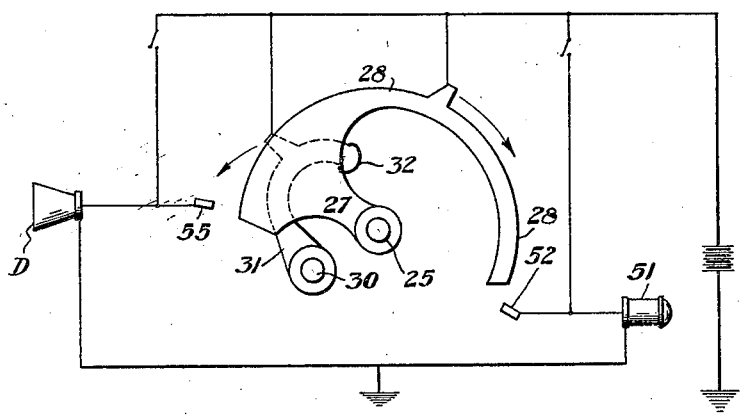
Figure 14:
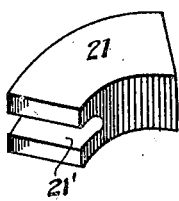
Figure 17:
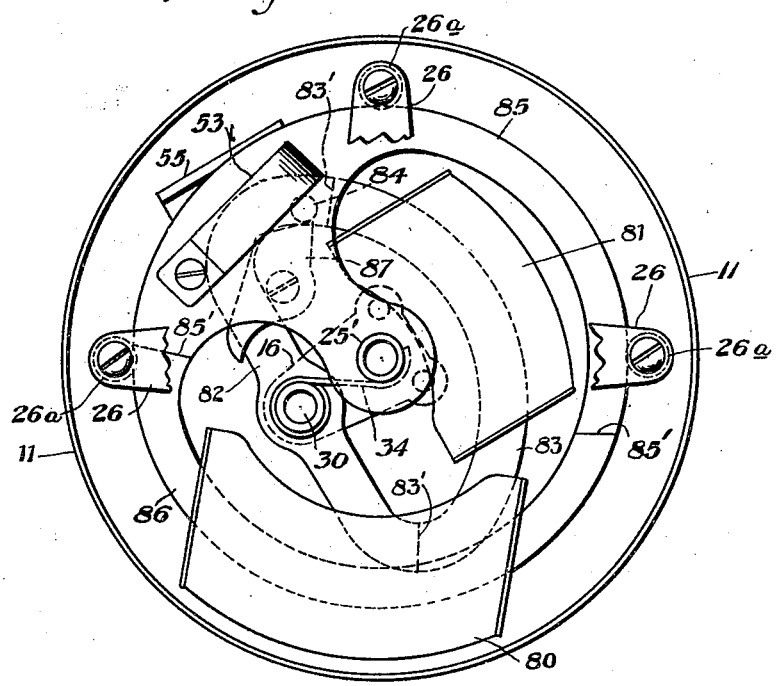
Figure 18:
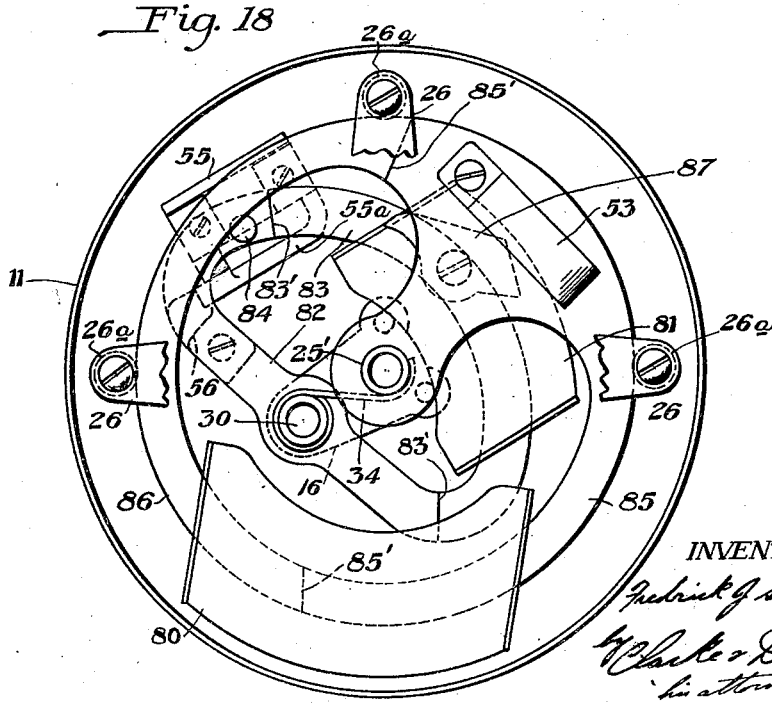

Fig. 12$^a$ is a detail perspective view of another of the operating parts;

Fig. 13 is a perspective view of one of the fluid pressure cylinders which may be used;

Fig. 14 is a perspective view of one of the pistons used in the mechanism for effecting actuation of the parts;

Fig. 15 is a wiring diagram for the circuits employed with the apparatus shown in the form of apparatus disclosed in Figs. 1 to 11 inclusive and Fig. 13, where fluid under pressure is used as the operating medium;

Fig. 16 is a wiring diagram showing the circuit where the device is electrically operated;

Figs. 17 and 18 correspond to Figs. 8 and 9 respectively, but show electric actuating means substituted for fluid pressure means.

Referring to Figs. 1 to 11 of the drawings, and particularly to Fig. 1, A represents one side of a support for a wind shield of any standard or preferred construction, and B represents a portion of a steering wheel post. The signal device is secured to the member A. It comprises a clamp 5 adapted to be attached to the member A having a round laterally projecting portion 6. Fitting over the portion 6 is a split sleeve 7 which is formed at one end of a crescent shaped bracket 8, and at 9 is a clamp for frictionally holding the sleeve 7 on the stub 6. Supported in the curved bracket 8 and secured thereto, is a round sheet-metal casing 10 which is closed on its open side by a plate 11. At 12 is a mirror, back of which is a felt pad 13, the mirror being held in place by a detachable ring 14 (see Fig. 5). On the inner face of the plate 11 is a hollow pedestal 15 having a base 16, by means of which it is supported on the plate. This pedestal is shown in detail in Fig. 10.

Mounted on the plate 11 on suitable supports, are two fluid pressure cylinders, square in cross section, and curved. The construction of the cylinders is shown in detail in Fig. 13, the main body portion thereof being formed of a sheet metal channel having a covering plate secured to the top thereof. Thus they may be cheaply constructed. Cylinder 17 is somewhat longer than cylinder 18. Fluid under pressure is admitted to the closed end of cylinder 17 through curved pipe 19, and to cylinder 18 through pipe 20. The opposite ends 17' and 18' of the cylinders 17 and 18 are open.

In cylinder 17 is a piston or plunger 21, such as shown in Fig. 14, the plunger being of a shape which conforms to the shape of the cylinder, and having a slot 21' formed in that end which is toward the open end of the cylinder. The piston or plunger is made of lignum vitæ wood, inasmuch as such wood does not require lubrication, and is not affected to any extent by atmospheric conditions. A similar piston 22 is placed in cylinder 18.

Figure 7:
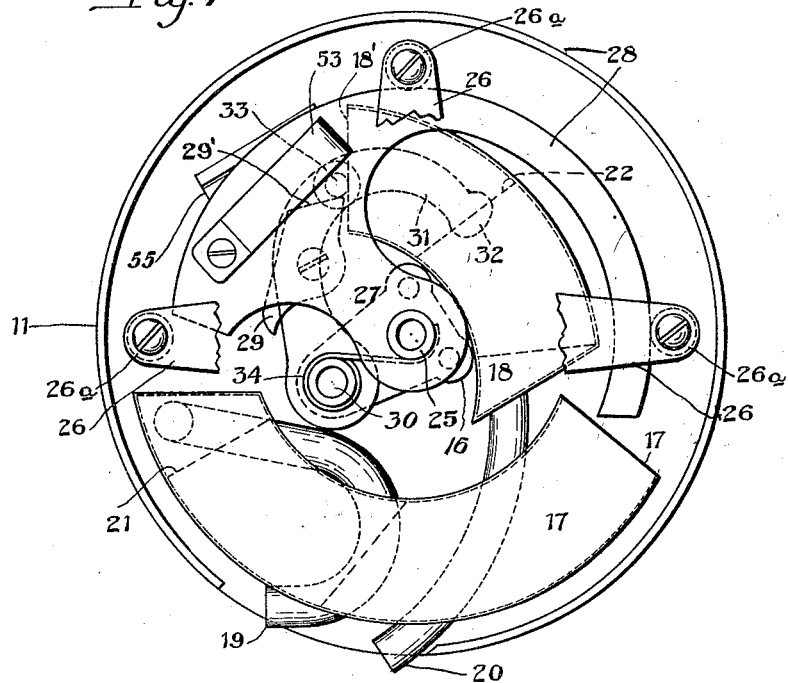
Fig. 7 is a front view of the signal arm operating mechanism with the casing removed, showing the parts in position to hold the signal in raised position, with a portion of a supporting member broken away.

Telescoping into the hollow pedestal which forms a bearing therefor is a central shaft 25 which projects outwardly through a journal in a supporting member 26 which is secured to posts 26ª and in which is a bearing 26ᵇ, and through a central opening in the casing 10. This supporting member may be stamped from sheet metal and have ribs formed therein, as shown in Fig. 9. Fixed on this shaft is a radially extending arm 27, and formed integral therewith is a curved extension 28, the curvature of the extension corresponding to the curvature of the cylinder 17 into which the extension may be projected, as shown in Fig. 8. Fixed to the under side of member 27, as shown in Figs. 7 and 8, is a projecting member 29 having an angular locking face 29'. When extension 28 is moved, the shaft 25 is rotated a corresponding distance.

A post 30 also extends out from base 16, and journaled about this post is a rotatable curved arm 31 having an outer end portion 32 and a projecting pin 33 thereon. This arm is adapted to normally project into cylinder 18, as shown in Fig. 7, a spring 34 normally urging the arm in this direction, but the introduction of fluid under pressure into cylinder 18 tends to move the arm to the position shown in Fig. 8, the groove in the piston 22 co-acting with the end portion 32 of the arm.

When the parts are in the position shown in Fig. 7, pin 33 engages the inclined locking face 29' on member 29, and a wedging action takes place whereby the arm 27 is held from rocking downwardly. When arm 31 is rocked to the position shown in Fig. 8, pin 33 is disengaged from surface 29' and the arm 27 with member 28 moves downwardly by gravity. By the introduction of fluid under pressure into cylinder 17, piston 21 then engaging the end of member 28 may be moved to return the arm 27 to the position shown in Fig. 7, where it will again be locked. The closed end of cylinder 17 serves as a stop to prevent the arm 27 being rocked too far backwards when returning to locked position. Support 17ª at the end of cylinder 17 serves as a stop for arm 31 on its rearward movement.

Secured to the outer projecting end of shaft 25 is a T-shaped member 35. The casing 10 is provided with a felt packing 10ª to prevent the entrance of dust and moisture around the portion of the stem of the T-shaped member which extends through the central opening in the casing. The cross bar 36 of the member 35 is hollow and extending therethrough and journaled therein is a shaft 37 having a shouldered portion 38 and a bifurcated upper end 39. An arm 40 is fixed to the lower end of the shaft 37, which extends through cross bar 36.

Riveted to the bifurcated end portion 39 of shaft 37 is a plate 41, which is of the shape shown, and is offset, so that the shaft is nearer one edge thereof than the other. The edges of the plate 41 are turned over at 42. A frame member 43 carrying a curved sheet of material 44 has its ends extending under portions 42, and a clamping plate 45 of sheet metal holds the frame in place. The sheet of material 44 is preferably made of celluloid or similar substance, preferably colored red, and having non-transparent strips or areas painted thereon, the curved outer end especially being non-transparent, as indicated by the shaded areas in the drawing. The frame member 43 is detachable, and the sheet of celluloid is detachable in frame 43, as indicated in Fig. 6, so that a new indicator may be substituted at any time, in the event that one becomes broken.

Upon rotation of the shaft 25 through a quarter of a turn, the indicator may be turned from a vertical to a horizontal position, as shown in Fig. 1. As also shown in this figure, the indicator is rotated on shaft 37 in member 36 to automatically "feather" it, that is, turn it edgewise to the line of travel of the vehicle when raised, and to present its flat surface in a vertical plane when shaft 37 is horizontal. For effecting this rotative movement of the indicator, arm 40 on the lower end of shaft 37 is guided in a stiff wire frame 48 secured to casing 10, as shown in Figs. 1 and 5. The arm acts as a cam, and the wire forms a cam path, and the wire is so shaped as to cause the arm 40 to be rotated ninety degrees when shaft 25 rotates a similar distance. Thus, the combined movement of the indicator is obtained upon rotation of shaft 25.

As hereinbefore explained, shaft 25 is rocked to lower the signal by gravity. By reason of the indicator being offset on shaft 37, it is not evenly balanced on its axis of rotation, and the turning of the indicator therefor acts as a counterbalance to prevent the signal from falling with too much force. In like manner, it acts to assist the upward movement of the signal.

Supported at one side of casing 10 on a bracket 50 is an electric light 51 adapted to project a beam onto the signal when the signal is lowered. The rays from this beam which strike the curved non-transparent end of the indicator are reflected back onto the central portion thereof. In order that the light will be lighted automatically when the signal is lowered and remain lighted so long as the signal is in warning position, a switch 52 having a stationary and a spring opened contact is secured to the casing 10 (see Fig. 5). On the curved member 28 at a proper position is an inclined cam 53 adapted to press the spring opened contact down when the signal is in warning position.

For closing a circuit to operate an audible alarm, such as a horn, only when the signal is about or has started to lower, but which circuit will be closed for only a short time, a similar switch 55 is secured to plate 11. On the curved arm 31 is a cam 56 for pressing the contact closed. The cam is so positioned that when arm 31 is rocked rearwardly by pressure in cylinder 18, it will engage the spring contact 55$^a$. When the arm is rocked rearwardly only a slight extent by the return movement of arm 27, the cam does not close the switch. Inasmuch as arm 31 is in the rearmost position for only an instant, the horn will give only a short blast.

For supplying fluid under pressure to the two cylinders alternately, I prefer to use a small pump C secured to the steering post B, or to any other convenient part of the vehicle. The pump comprises a cylindrical casing 60 having a bottom 61 in which are two grooves or recesses 62 and 63 (see Fig. 4) from which lead pipes 64 and 65 respectively. Over the bottom 61 is a disk 66 having an opening therethrough. At 67 is a square shaft rotatably secured in bottom 61 at 68. Disk 66 has a square opening in its center through which the shaft passes, the arrangement being such that upon rotating the square shaft, the disk is rotated to bring the opening therein into register with one or the other of grooves 62 and 63.

The piston or plunger is indicated at 69, and is carried on a hollow round rod 70 having a square opening therethrough, so that the rod 70 telescopes over the square rod 67. Fixed to the upper end of rod 70 is a handle or knob 71 and an indicator or pointer 72. By this arrangement, the plunger may be reciprocated, and by turning the knob, disk 66 may be rotated. The indicator 72 serves to point out the position of the opening in disk 66. If the plunger is pushed downwardly with the opening in the disk over groove 62, air will be forced out pipe 64, and if the opening in the disk is over groove 63, the air is forced out of pipe 65. Pipe 64 is connected by a hose or flexible pipe 64' with pipe 19 leading into cylinder 17, and pipe 65 connects through hose or pipe 65' with pipe 20 leading into cylinder 18.

In operation, assuming the signal or indicator 44 and its attached parts to be in vertical position, the driver of the car turns the knob 71 to bring the port in disk 66 into register with groove 63. By reason of pointer 72 he can easily determine this. He then forces the plunger down, forcing air into cylinder 18, moving its piston 22 toward end 18', rocking arm 31 to move pin 33 to a position where surface 29' on member 29 is disengaged, whereby the indicator falls to a horizontal position by gravity, at the same time that it rotates ninety degrees by the rotation of shaft 37 through cam 40. When arm 31 is rocked back, switch 55 is closed for an instant, closing a circuit to a horn D, as indicated in Fig. 15. Arm 31 is then returned to normal position by spring 34.

When the driver wants to raise the signal from warning position, he turns knob 71 a part turn, bringing the port in disk 66 into register with groove 62, whereupon, by pushing down on the knob, air will be forced into cylinder 17, moving plunger 21 toward the end 17', thereby moving member 28 to rock shaft 25 to raise the indicator. When the curved member 28 has been moved a sufficient distance, the parts will automatically lock to hold them in raised position. A small spring plunger or pin 75 (see Fig. 1) in a housing 76 may be provided for bearing against the lower end of member 36 for urging the indicator in a direction to be rotated to warning position. Inasmuch as the parts lock tighter when they are constantly urged in this direction, vibration and rattle will be prevented, and the signal will be positively moved a short distance when the locking member is released, so that there is no likelihood of the signal not moving to warning position at the proper time.

In the embodiment shown in Figs. 16, 17 and 18, similar parts to those used in the other construction are designated by similar reference numerals. In place of cylinders 17 and 18, however, I employ solenoids 80 and 81 corresponding thereto. Pivoted at 30 is an arm 82 of brass or other reluctance material, to the ends of which is secured a curved soft iron core 83, the iron core passing through the solenoid 81 and terminating at points 83'. At 84 is a locking pin corresponding to pin 33. Mounted on a shaft 25' corresponding to shaft 25 heretofore described, is an arm with curved extensions 85, of brass or other non-magnetic or reluctance material, and secured to the ends of the extensions at 85' is a curved soft iron core 86 which passes through solenoid 80. At 87 is a locking member for cooperating with pin 84 and corresponding with member 29 in the construction previously described. Figs. 11 and 12 indicate how an armature 86 may be readily attached to member 28, as shown in Fig. 11, so that interchangeable standard parts may be used.

The operation is in all ways similar to the air operated construction, but in place of a pump on the steering post, a double contact switch is used, the contacts being at 88 and 89 (see Fig. 16). Contact 88, when closed, energizes magnet 80 and contact 89, when closed, energizes solenoid 81. The energization of the solenoids through these contacts operates the parts similarly to the operation of the air cylinders.

In practice, it is contemplated that the solenoids and the air cylinders be interchangeable so that a manufacturer can make either form of device from standard parts.

The device as described has few parts, all of which can be cheaply manufactured and the parts can be easily assembled. Pivoted connecting links and other expensive or difficult parts to assemble are dispensed with.

Obviously, various changes and modifications are within the contemplation of the appended claims, and I do not limit myself to the particular construction described.

I claim:

1. A signal comprising a supporting member, an indicator movably mounted on the supporting member, a movable locking means for holding the indicator against movement when in normal position, means for releasing the locking means to allow the indicator to move to warning position, means for returning the indicator to normal position, and means for controlling and releasing an indicator returning means.

2. A signal comprising a supporting member, a rotatable shaft thereon, means for rotating the shaft, an indicator rotatably carried by the shaft whereby the indicator is swung through an arc upon rotation of the shaft, and means for automatically rotating the indicator relatively to the shaft upon such movement of the shaft.

3. A signal comprising a casing adapted to be secured to a vehicle, a rotatable shaft on the casing, means for rotating the shaft in opposite directions through a limited arc, an indicator carried on said shaft, and outside the casing, and rotatable at right angles to said shaft, an arm connected to the indicator, and guiding means on the casing engaging the arm for automatically rotating the indicator when the indicator is moved upon rotation of said shaft.

4. A signal comprising a casing adapted to be secured to a vehicle, a rotatable shaft, an indicator carried by the shaft, a movable means in the casing for effecting the rotation of the shaft, a movable means for locking the shaft against movement, and means for successively effecting the operation of both of said movable means to operate the indicator.

5. A signal for vehicles comprising a casing, a rotatable shaft in the casing, an indicator on the shaft, said indicator having a raised and a lowered position and adapted to be moved from raised to lowered position by gravity, and normally being in the raised position, locking means for holding the indicator against movement when it is in the raised position, means for releasing the locking means, and means for returning the indicator from lowered to raised position.

6. A signal for vehicles comprising a casing, a rotatable shaft in the casing, an indicator on the shaft having a raised and a lowered position and adapted to move from raised to lowered position by gravity, locking means for holding the indicator against movement only when in raised position, means for effecting the movement of the locking means to release the locking means, remotely located means for returning the indicator from lowered to raised position, and means outside the casing and adapted to be located at any suitable place on the vehicle for controlling the actuation of the indicator.

7. A signal for vehicles comprising a casing, a rotatable shaft in the casing, an indicator carried by the shaft and outside the casing having a raised and a lowered position, a member on the shaft within the casing, a movable locking member engaging with said member on the shaft for holding said indicator from movement from its raised to its lowered position, automatic means under the control of the operator for moving the locking member to permit the indicator to move to its lowered position, automatic means for returning the locking member to its normal position, and means operable at the will of the operator for returning the indicator to its raised position.

8. A signal for vehicles comprising a casing, a rotatable shaft in the casing, an indicator carried by the shaft having a raised and a lowered position and adapted to be moved from raised to lowered position, means for locking the indicator against movement from raised to lowered position, automatic means under the control of the operator for releasing the locking means, and means for returning the indicator from lowered to raised position.

9. A signal for vehicles comprising a casing, a rotatable shaft in the casing, an indicator carried by the shaft having a raised and a lowered position and adapted to be moved from raised to lowered position, means for locking the indicator against movement from raised to lowered position, means for releasing the locking means, and means for returning the indicator from lowered to raised position, said locking means being arranged to automatically lock said indicator against movement upon said indicator being returned from lowered to raised position.

10. A signal for vehicles comprising a casing, a shaft in the casing, an indicator on the shaft having a raised and a lowered position and adapted to normally remain in the raised position, means for locking the indicator from moving to its lowered position when raised, means for releasing the locking means, means for urging the indicator toward lowered position when raised, and means for moving the indicator from lowered to raised position.

11. A signal for vehicles comprising a casing, a shaft in the casing, an indicator on the shaft outside the casing having a raised and a lowered position and adapted to normally remain in raised position, means for locking the indicator from moving to its lowered position when raised, fluid pressure actuated means for releasing the locking means to permit the movement of the indicator to lowered position, and a fluid pressure actuated means for returning the indicator from lowered to raised position.

12. A signal for vehicles comprising a casing, a shaft in the casing, an indicator on the shaft outside the casing having a raised and a lowered position and adapted to normally remain in raised position, means for locking the indicator from moving to its lowered position when raised, fluid pressure actuated means for releasing the locking means to permit the movement of the indicator to lowered position, a fluid pressure actuated means for returning the indicator from lowered to raised position, and means adapted to be located at any suitable place on a vehicle for selectively supplying fluid under pressure to either of said fluid pressure actuated means.

13. A signal for vehicles comprising a casing, a shaft in the casing, an indicator on the shaft outside the casing having a raised and a lowered position and adapted to normally remain in raised position, means for locking the indicator from moving to its lowered position when raised, fluid pressure actuated means for releasing the locking means to permit the movement of the signal to lowered position, a fluid pressure actuated means for returning the indicator from lowered to raised position, and means adapted to be located at any suitable place on a vehicle for selectively supplying fluid under pressure to either of said fluid pressure actuated means, said means including a pump having an operating handle and two ports therein, and a valve controlled by rotation of the operating handle for causing either one of the ports to be opened, the compression of the fluid being effected by reciprocation of the handle.

14. A signal for vehicles comprising a casing, a shaft in the casing, an indicator on the shaft outside the casing having a raised and a lowered position and adapted to normally remain in raised position, means for locking the indicator from moving to its lowered position when raised, fluid pressure actuated means for releasing the locking means to permit the movement of the indicator to lowered position, and a fluid pressure actuated means for returning the indicator from lowered to raised position, both of said fluid pressure actuated means including cylinders having pistons of lignum vitæ wood therein.

15. A signal for vehicles comprising a casing, means whereby it may be secured to a vehicle, a rotatable shaft in the casing, an indicator on the shaft and outside the casing, a curved member carried by the shaft inside the casing, a curved cylinder inside the casing having a piston therein adapted to engage the curved member to rotate the shaft, a locking member having means thereon adapted to cooperate with means on said curved member to hold the shaft against rotation, and a fluid pressure cylinder having a piston therein for moving the locking member to release it, and means for returning the locking member to normal position.

16. A signal for vehicles comprising a casing, a transparent indicator having a curved end portion arranged to reflect light, means in the casing for moving the indicator to different positions, a light arranged to illuminate the indicator and positioned so that the ray will strike said curved end and be reflected against other portions of the indicator, and means for controlling the operation of the indicator.

17. A signal for vehicles comprising a supporting means, an indicator having a raised and a lowered position, means whereby the movement of the indicator from one position to the other may be effected, means for rotatably supporting the indicator, means for effecting the rotation of the indicator when it is moved from one position to the other, said indicator being unbalanced with respect to the means on which it is rotatably supported whereby the rotative movement of the indicator checks its swinging movement in one direction and assists its swinging movement in the other direction.

18. A signal for vehicles comprising a casing adapted to be secured to a vehicle, a rotatable shaft carried thereby, an indicator on the shaft and outside the casing having a raised and a lowered position and adapted to be moved to its lowered position by gravity, a movable locking member for holding the indicator from movement to its lowered position, means for releasing the locking member, a movable means for raising the indicator from lowered to raised position, an audible signal, and means movable with the locking means for effecting the operation of the audible signal only during the instant when said locking means moves to releasing position.

In testimony whereof I affix my signature in presence of two witnesses.

FREDRICK J. STEMMRICH.

Witnesses:
 LOIS WINEMAN,
 WM. H. PARMELEE.